(12) United States Patent
Glinka

(10) Patent No.: US 9,496,786 B2
(45) Date of Patent: Nov. 15, 2016

(54) VOLTAGE SETTING DEVICE WITH MULTI-STEP VOLTAGE OUTPUT

(75) Inventor: Martin Glinka, Uttenreuth (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 370 days.

(21) Appl. No.: 14/119,003

(22) PCT Filed: May 21, 2012

(86) PCT No.: PCT/EP2012/059346
§ 371 (c)(1),
(2), (4) Date: Apr. 2, 2014

(87) PCT Pub. No.: WO2012/160017
PCT Pub. Date: Nov. 29, 2012

(65) Prior Publication Data
US 2015/0028831 A1    Jan. 29, 2015

(30) Foreign Application Priority Data

May 20, 2011    (DE) .......................... 10 2011 076 199

(51) Int. Cl.
*H02M 5/22* (2006.01)
*H02M 5/297* (2006.01)
(Continued)

(52) U.S. Cl.
CPC ............... *H02M 3/158* (2013.01); *B60L 9/28* (2013.01); *H02M 5/225* (2013.01); *H02M 5/297* (2013.01);
(Continued)

(58) Field of Classification Search
CPC .................. H02M 3/155; H02M 3/156; H02M 3/157; H02M 3/158; H02M 3/1584
See application file for complete search history.

(56) References Cited

U.S. PATENT DOCUMENTS 5,642,275 A * 6/1997 Peng ....................... H02M 7/49
  363/137
6,005,788 A   12/1999 Lipo et al.
(Continued)

FOREIGN PATENT DOCUMENTS

DE    19721450 C1    6/1998
DE    10217889 A1    11/2003

OTHER PUBLICATIONS

A. Antonopoulos et al; On dynamics and voltage control of the Modular Multilevel Converter; Power Electronics and Applications, 2009, EPE '09, 13th European Conference on, IEEE, Piscataway, NJ, USA; pp. 1-10; ISBN: 978-1-4244-4432-8,; 2009; US; Sep. 8, 2009.

(Continued)

*Primary Examiner* — Jeffrey Gblende
(74) *Attorney, Agent, or Firm* — Laurence Greenberg; Werner Stemer; Ralph Locher

(57) ABSTRACT

A voltage setting device has at least one multi-step voltage output, at least one power converter unit, which has at least one first power element that forms at least a part of a power converter branch, and a control unit that controls the first power element according to a first voltage step structure to provide a branch voltage. The power converter unit includes at least one second power element that, together with the first power element, forms the power converter branch and includes a group of modules, each with at least one energy storage device, a switch group and a module output. In a given control mode the control unit controls the group of modules to provide the branch voltage in cooperation with the first power element according to a second voltage step structure which is more detailed than the first voltage step structure.

20 Claims, 4 Drawing Sheets

(51) Int. Cl.
  *H02M 7/493* (2007.01)
  *H02M 3/158* (2006.01)
  *H02M 7/483* (2007.01)
  *B60L 9/28* (2006.01)

(52) U.S. Cl.
  CPC ........... *H02M 7/483* (2013.01); *B60L 2200/26* (2013.01); *B60L 2210/30* (2013.01); *B60L 2210/40* (2013.01); *H02M 2007/4835* (2013.01); *Y02T 10/7241* (2013.01)

(56) References Cited

U.S. PATENT DOCUMENTS

| 7,269,037 | B2 | 9/2007 | Marquardt | |
|---|---|---|---|---|
| 8,138,632 | B2* | 3/2012 | Sommer | H02M 7/49 307/87 |
| 8,649,187 | B2* | 2/2014 | Aiello | H02M 7/49 363/131 |
| 2011/0115532 | A1* | 5/2011 | Roesner | H02M 7/487 327/136 |

OTHER PUBLICATIONS

Ruderman A. et al; A hybrid asymmetric cascaded multilevel inverter comprising high resolution parts; Electrical and Electronics Engineers in Israel, IEEEI 2008, IEEE 25th Convention of, IEEE, Piscataway, NJ; pp. 21-25; ISBN: 978-1-4244-2481-8; 2008; US; Dec. 3, 2008.

Glinka M. et al; A New AC/AC Multilevel Converter Family; IEEE Transactions on Industrial Electronics, IEEE Service Center, Piscataway, NJ; vol. 52; No. 3; pp. 662-669; ISSN: 0278-0046; XP011133044; 2005; US; Jun. 1, 2005.

Rodriguez J. et al; Multilevel Voltage-Source-Converter Topologies for Industrial Medium-Voltage Drives; IEEE Transaactions on Industrial Electronics, IEEE Service Center, Piscatawas, NJ; vol. 54; No. 6; pp. 2930-2945; ISSN: 0278-0046; 2007; US; Dec. 1, 2007.

* cited by examiner

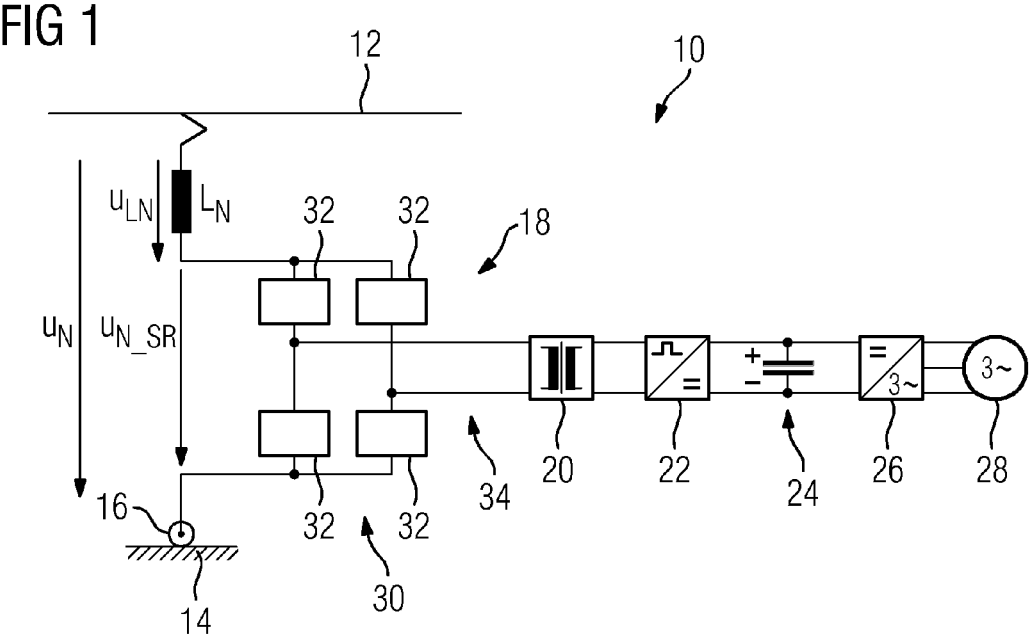
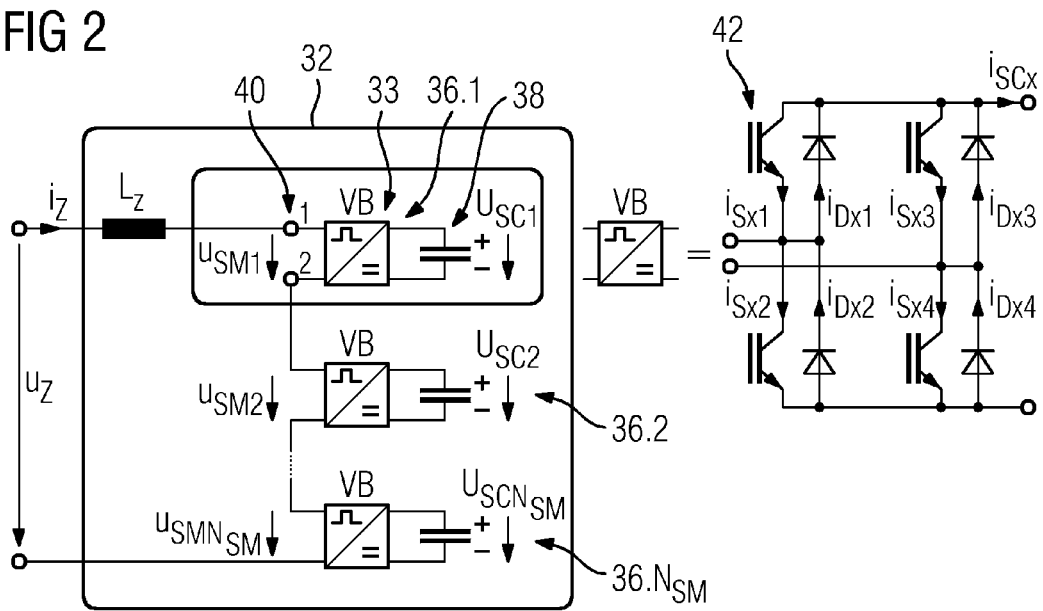

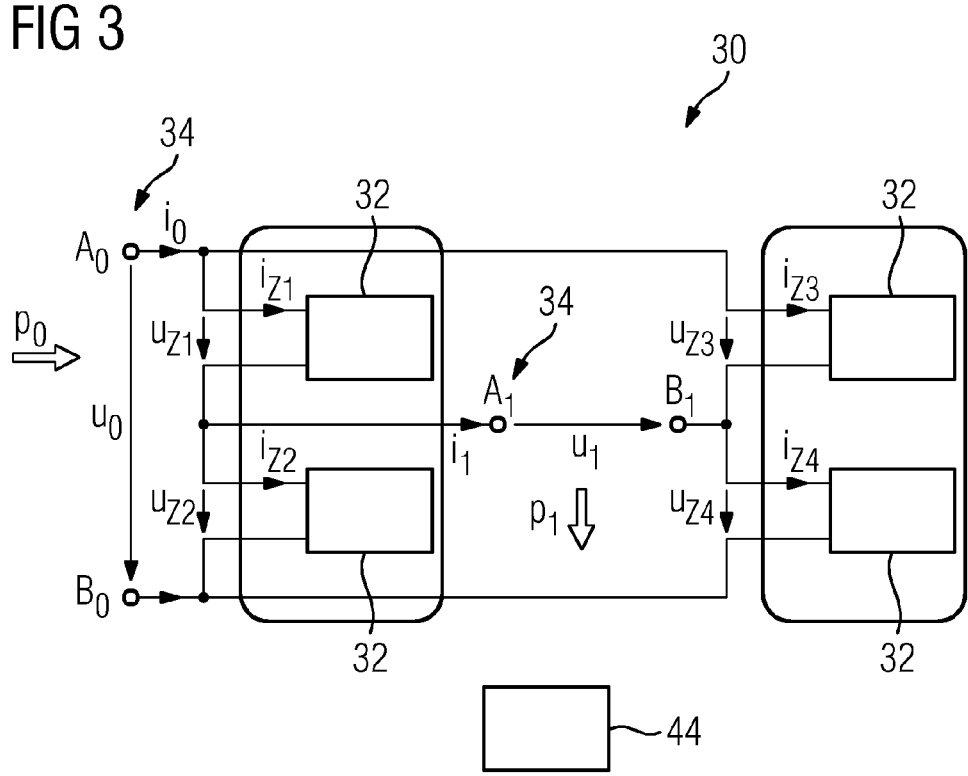

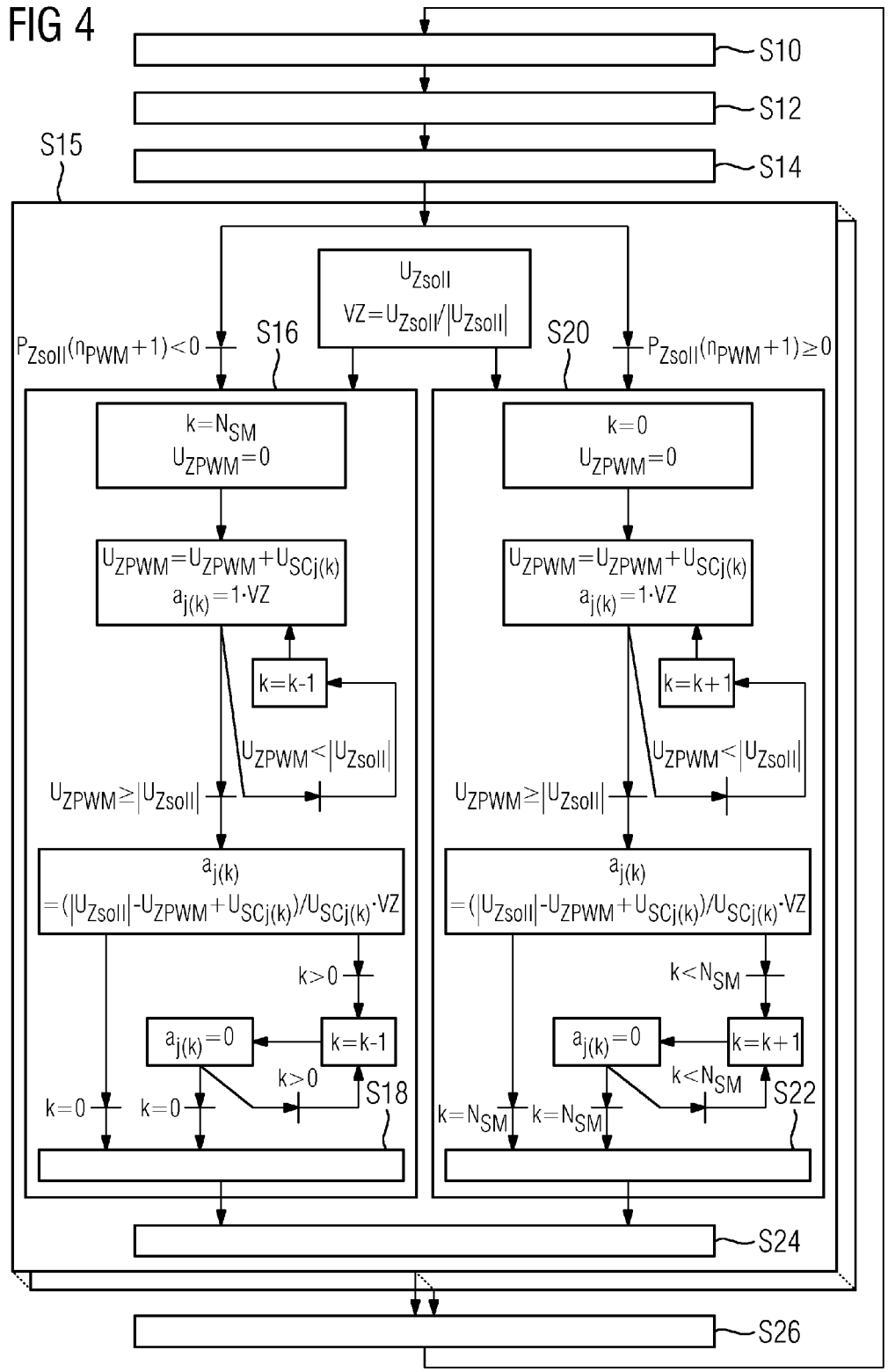

VOLTAGE SETTING DEVICE WITH MULTI-STEP VOLTAGE OUTPUT

BACKGROUND OF THE INVENTION

Field of the Invention

The invention relates to a voltage setting device comprising at least one multi-step voltage output, at least one power converter unit, which has at least one first power section which forms at least a section of a power converter branch, and a control unit, which controls the first power section for providing a branch voltage in accordance with a first voltage step structure.

Such voltage setting devices comprising a multi-step voltage output, also referred to as output with multi-point voltages, are known in particular in the form of modular direct converters. In this embodiment, a voltage step structure is provided in which the voltage steps are identical or the available voltage levels are equidistant. This corresponds to a voltage step structure with "uniform" voltage steps. In such modular embodiments, all of the modules in a power converter branch have an identical design. For example, such a power converter is disclosed in DE 197 21 450 C1.

In the case of voltage setting devices comprising multi-step output voltages, the distortion factor of the voltage output can be markedly reduced when the step voltage amplitudes are distributed nonuniformly or the step levels are different, in comparison with the abovementioned uniform output voltages. Power converters which generate multi-point voltages with such "nonuniform" step voltages are known from literature in the English language as "asymmetric multilevel converters".

In order to generate nonuniform output voltages, it has already been proposed to generate the multi-step output voltages whilst building on a main power section, using additional, separate power converters with a topology which deviates from the topology of the main power section. This is described, for example, in "Asymmetric multilevel converter for high resolution voltage phasor generation", Rufer, A. and Veenstra, M., EPE'99, Lausanne (1999). One disadvantage with this solution consists in the additional interface and the complexity for implementing redundancies.

BRIEF SUMMARY OF THE INVENTION

The invention is based on the object of providing a voltage setting device of the generic type in which nonuniform output voltage steps can be generated with a construction which is particularly simple in design terms.

For this, it is proposed that the power converter unit comprises at least one second power section which, with the first power section, forms the power converter branch and has a group of modules, which each have at least one energy storage device a switch group and a module output, and the control unit in at least one control mode is intended to control at least the group of modules for providing the branch voltage in interaction with the first power section in accordance with a second voltage step structure which is finer than the first voltage step structure. By virtue of the proposed combination of features, nonuniform output voltage steps with a particularly simple design for the power converter unit can be provided. By virtue of providing a voltage step structure which is finer than the first voltage step structure, voltage steps can be generated for the branch voltage which are between adjacent voltage steps of the first voltage step structure. By virtue of the combination of the voltage step structures assigned to the power sections which results owing to the interaction of the power sections, nonuniform voltage steps can be generated for the branch voltage and therefore the voltage output of the voltage setting device, to which the branch voltage contributes.

A "switch group" is intended to mean in particular a group of switching elements such as in particular semiconductor switches, for example in the form of IGBT transistors. The polarity or the mathematical sign of a module output voltage can be set by the control unit by controlling the switch group of the respective module. The switch groups expediently each have a first switching state, which effects charging of the energy storage device, a second switching state, which effects discharging of the energy storage device, and at least one third switching state, in which the module is short-circuited at the module output, wherein the energy storage device voltage of the module does not contribute to the branch voltage. "Intended" should further be understood to mean in particular specially designed, embodied, formed, equipped and/or programmed.

The invention is suitable in particular for use at medium and/or high voltages. For example, the voltage setting device can be arranged in a rail-borne vehicle, in which an electrical voltage drawn by a line of a rail network for supplying energy at least to the drive components of the vehicle is converted in terms of at least one property. The voltage at the input of the voltage setting device in this case has an amplitude or frequency which is typical of a rail network energy supply.

In this context, the proposed voltage setting device can advantageously be used for interference current compensation during operation of the rail-borne vehicle with a direct current (DC operation). The voltage setting device can in this case be part of a medium-voltage converter, which is typically not used in DC operation.

As a result, the large and heavy filter components which are generally used for interference current compensation can be dispensed with, and complex adaptation or reconfiguration of an existing medium-voltage converter for the application as interference current compensator can be avoided when the configuration according to the invention is applied.

The voltage setting device can also be used in High-Voltage Direct Current transmission (HVDC). In this case, it is designed for input voltages which preferably have a value of over 100 kV.

A preferred configuration of the invention proposes that the first voltage step structure has uniform voltage steps. As a result, conventional topologies can be used at least for the first power section.

Topologies which appear to be expedient to a person skilled in the art are conceivable for the design of the first power section. In order to achieve a particularly simple interface between the power sections, one advantageous embodiment of the invention proposes, however, that the first power section has a set of modules. As a result, the power converter unit can have a modular topology overall.

These modules of the first power section preferably have at least one energy storage device, a switch group and a module output.

The design of the power converter unit can in this context also be further simplified when the first power section and the second power section have identical modules. As a result, in addition advantageous redundancy can be achieved in a particularly simple manner in the event of a fault.

In this embodiment, at least one module of the first power section, or at least one subgroup of modules of the first power section, and at least one module of the second power section, or at least one subgroup of modules of the second power section, have an identical design. In a particularly advantageous design, the modules of the first and second power sections have an identical design. This proposed embodiment has the advantage that an existing, conventional modular power converter structure with identical modules can be used by the proposed embodiment of the control unit for generating nonuniform output voltage steps by virtue of an existing set of identical modules of a power converter branch being divided into at least two subgroups, which each have the function of the first and second power sections. In this case, the control unit will, in the control mode, expediently control the modules of these subgroups differently. Alternatively, an existing power converter structure with a present set of modules can be adapted with low complexity by adding further identical modules to the existing set. In the latter case, the need for a complex interface for the added modules is not necessary. In the event of a fault, any desired module of the power converter branch can take on the function of a failed module.

The design of two modules is "identical" when preferably at least the respective switch groups of the modules have an identical topology. The respective energy storage devices can also have identical physical properties.

In this embodiment of the power converter unit as a modular power converter unit, the step voltage amplitudes can thus be lowered by a multiple or nonuniform voltage steps with a much higher step number can be generated whilst maintaining the modular power converter properties with little additional complexity. In addition, the advantageous redundancy properties of the modular power converter can be maintained.

In addition, advantageous flexibility can be achieved when the control unit is intended to change an assignment of at least one module of the power converter branch to the first or the second power section. This assignment can be matched in particular to operating conditions, such as, for example, the individual temperatures of the power components of the power sections. Thus, an undesired heating of the power components can be avoided.

In accordance with a preferred embodiment, it is proposed that modules, preferably all of the modules, of at least the second power section are each intended to generate a bipolar module output voltage, as a result of which a high degree of flexibility in the control of these modules can be achieved.

A further embodiment proposes that at least one switch group is in the form of a bridge circuit, as a result of which a configuration of the power converter unit which is particularly simple in design terms can be achieved. By virtue of the use of bridge circuits, in addition the invention, which is suitable in particular for power converter units as direct converters, can be used in modular intermediate circuit power converters. In this case, the nonuniform voltage steps can be generated with the aid of full-bridge modules.

If, as proposed above, the first power section has a set of modules, in this case the first power section, as a deviation from the second power section, as is conventional in the case of modular intermediate circuit power converters, can be realized with switching groups comprising half-bridge circuits. However, it is also possible owing to lower costs and improved efficiencies for the first power section to advantageously have a mixed configuration comprising modules with switching groups comprising half-bridge and full-bridge circuits.

In accordance with an embodiment of the control mode which is advantageous with respect to the proposed topology of the second power section, in the control mode, the branch voltage is generated by a modulation method in accordance with a branch voltage setpoint value to be achieved, wherein, during a modulation period, the first power section contributes to a proportion of the branch voltage setpoint value in accordance with the first step voltage structure, and the modules of the second power section generate the difference of the proportion with respect to the branch voltage setpoint value by modulation.

If the first power section, in the same way as the second power section, has a set of modules, in this context it is additionally proposed that the control unit determines modules of the first power section which contributes to the branch voltage during the modulation period depending on the branch voltage setpoint value and in accordance with the first voltage step structure. The modules of the first power section which may remain left over preferably do not contribute to the branch voltage by virtue of them being short-circuited at the module output expediently during the modulation period. There are conventional methods for the control of the first power section which are matched in particular to the control of modular power converters, in particular methods for generating uniform step voltages, for the formation of the control unit. In accordance with a known method, in particular the polarity or the mathematical sign of the module output voltages of the contributing modules of the first power section is coupled to the branch voltage setpoint value by virtue of the energy storage device voltages of the contributing modules of the first power section with the same polarity as the polarity of the branch setpoint voltage being connected. During the modulation period, at least a predominant portion of the contributing modules of the first power section preferably remains permanently connected, wherein at least one module of the first power section participates in the modulation method with modules of the second power section.

In a preferred embodiment of the invention, the control unit establishes a combination of the module output voltages of the second power section for the modulation period in accordance with the second voltage step structure, wherein the polarity of the individual module output voltages is independent of the branch voltage setpoint value during the modulation period. As a result, despite the low energy content of the energy storage devices of the second power section, the module output voltages of the modules of said power section can be regulated in optimum fashion. In particular, it is possible to establish for each module of the second power section independently of the operating state of all other modules whether the respective energy storage device is intended to be charged by the branch current or discharged in the modulation period. Thus, in a manner different than in the abovementioned method with the first power section, the polarity of the module output voltages of the second power section can be controlled freely by the control unit in a manner decoupled from the branch voltage setpoint value. This enables particularly precise approximation of the branch voltage setpoint value by steps of the second step voltage structure.

It is furthermore proposed that the energy storage devices of the second power section have different voltages during the modulation period. Thus, by virtue of a combination of the module output voltages in the second power section, a particularly fine step voltage structure can be achieved.

If the first power section has a set of modules, in this context a particularly advantageous step voltage structure can be achieved when, during the modulation period, at least one module of the first power section has an energy storage device voltage amplitude which is less than or equal to twice the maximum energy storage device voltage amplitude of the second power section. The "amplitude" of a voltage V is intended to mean in particular the absolute value |V|. This at least one module of the first power section can draw its energy from the remaining modules of the first power section and/or from a separate energy supply device.

In a further advantageous development of the invention, it is proposed that in order to generate the branch voltage in accordance with the branch voltage setpoint value, two voltage steps closest to the voltage setpoint value are determined, and averaging over time of the voltage steps by virtue of PWM edge clocking over the modulation period maps the branch voltage setpoint value. As a result, the contribution of further, undesired step voltages to the averaging can be at least reduced, in particular prevented.

It is additionally proposed that the energy storage devices are in the form of storage capacitors, as a result of which conventional common hardware structures for the power converter unit can be used.

In accordance with a development of the invention, it is proposed that the control mode can be switched on and off, as a result of which a high degree of flexibility in the application of the voltage setting device can be achieved. If the first voltage step structure has uniform voltage steps, the possibility of a change between the generation of uniform and nonuniform multi-point voltages depending on the operating conditions (for example normal operation, redundancy operation or normal operation with different operating conditions or more stringent requirements) can be achieved.

The invention is also based on a method for providing an electrical voltage by means of a voltage setting device, which has at least one multi-step voltage output, in which method a first power section, which forms at least a section of a power converter branch is controlled for providing a branch voltage in accordance with a first voltage step structure.

It is proposed that at least one second power section which, with the first power section, forms the power converter branch and comprises a group of modules which each have at least one energy storage device, a switch group and a module output, is controlled, wherein at least the group of modules is controlled for providing the branch voltage in interaction with the first power section in accordance with a second voltage step structure which is finer than the first voltage step structure. By virtue of the proposed combination of features, nonuniform output voltage steps can be provided with a particularly simple design of the power converter unit. By providing a voltage step structure which is finer than the first voltage step structure, voltage steps can be generated for the branch voltage which are between adjacent voltage steps of the first voltage step structure. As a result of the combination of voltage step structures which are assigned to the power sections which results owing to the interaction of the power sections, nonuniform voltage steps can be generated for the branch voltage and therefore the voltage output of the voltage setting device to which the branch voltage contributes.

BRIEF DESCRIPTION OF THE SEVERAL VIEWS OF THE DRAWING

An exemplary embodiment of the invention will be explained with reference to the figures, in which:

FIG. 1 shows a drive unit for a rail-borne vehicle, comprising a voltage setting device according to the invention, FIG. 2 shows a detailed view of a power converter branch of the voltage setting device and a module forming this power converter branch, FIG. 3 shows a power converter unit of the voltage setting device and a control unit, FIG. 4 shows a method for the control unit in accordance with a first control mode.

DESCRIPTION OF THE INVENTION

Figure 5:
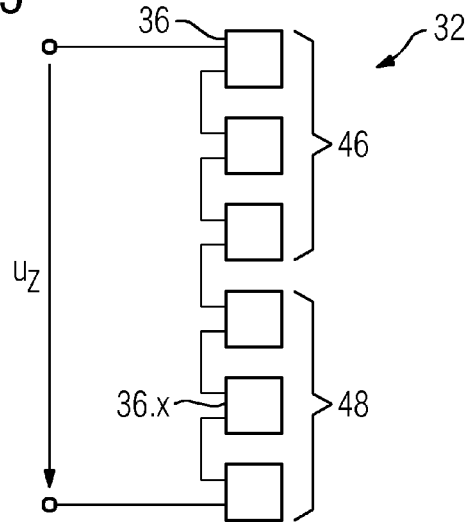
FIG. 5 shows a subdivision of the power converter branch shown in FIG. 2 into two power sections.

FIG. 1 shows a schematic view of a drive unit 10 for a rail-borne vehicle. This view shows an overhead line 12, an inductance $L_N$, a rail 14, which is in contact with a wheel 16 of the rail-borne vehicle, a voltage setting device 18, a mid-frequency transformer 20, a rectifier 22, an intermediate circuit 24, a frequency converter 26 for generating a three-phase drive current which is fed into an asynchronous motor unit 28. The voltage conducted by the overhead line can have values of 15 kV/16.7 Hz or 25 kV/50 Hz, for example. Also illustrated are the voltage drops of the abovementioned components $L_N$ and 18, which are connected between the overhead line 12 and the mid-frequency transformer 20.

The voltage setting device 18 has a power converter unit 30, which comprises four power converter branches 32, and a voltage output 34. The power converter unit 30 in the exemplary embodiment under consideration is in the form of a modular power converter unit, to be precise in particular comprising four identical power converter branches 32.

FIG. 2 illustrates the embodiment of the power converter branches 32. The power converter branch 32 comprises a set 33 of $N_{SM}$ modules 36.1 to 36.$N_{SM}$, which are connected in a cascade circuit.

The modules 36 each have a switch group VB, which is shown in a more detailed view on the right-hand side of the illustration of the power converter branch 32. In addition, the modules 36 each comprise an energy storage device 38, which is in the form of a storage capacitor, for example, and a module output 40. The energy storage device voltages or storage capacitor voltages are denoted by $U_{SCj}$, where $j = 1 \ldots N_{SM}$. The module outputs 40 each have a module output voltage, which is denoted by $U_{SMj}$.

In addition, an inductance $L_Z$, which in individual cases for targeted regulation of the branch current $i_Z$, can advantageously be integrated in the power converter branch 32, is optionally connected upstream of the cascade circuit of modules 36.

The combination of the module output voltages $u_{SMi}$, or the sum thereof, corresponds to the branch voltage $u_Z$.

As already mentioned above, the design of the switch groups VB is illustrated in more detail in the illustration on the right-hand side of FIG. 2. The switch group VB corresponds to an arrangement of semiconductor switches 42, which is in the form of a full-bridge circuit in the exemplary embodiment under consideration. In the embodiment under consideration, the modules 36 of the set 33 have an identical design.

FIG. 3 shows the power converter unit 30 with the arrangement of the power converter branches 32 and the terminals $A_0, B_0, A_1, B_1$ of the voltage output 34. The power converter unit 30 is in the form of a single-phase modular direct converter, which, as has already been mentioned above, has four identical power converter branches 32. Each power converter branch 32 is a two-port network, wherein a multi-step bipolar voltage $u_{Zx}$ is impressed at the connection terminals of said two-port network, wherein x=1 . . . 4.

In order to control the four branch voltages $u_{Z1}$ . . . $u_{Z4}$, a control unit 44 is provided which is operatively connected to the power converter branches 32, to be precise in particular to the switch groups VB of the modules 36.*i*. By virtue of the control of the four branch voltages $u_{Z1}$ . . . $u_{Z4}$ corresponding to the equations (1) and (2), the terminal voltages $u_0$ and $u_1$ of the power converter unit 30 can be controlled as desired. In order that the circuit can impress these two voltages in an unrestricted manner, the equation (3) needs to be fulfilled at any time.

$$u_{Z1}=u_{Z4}=(u_0-u_1)/2 \quad (1)$$

$$u_{Z2}=u_{Z3}=(u_0+u_1)/2 \quad (2)$$

$$\hat{u}_{Zx}>=(\hat{u}_0+\hat{u}_1)/2 \quad (3)$$

By virtue of a regulation of the branch voltages corresponding to equations (1) and (2), it is ensured that the terminal currents $i_{Zi}$ are distributed evenly among the power converter branches 32.

First, a first control mode of the control unit 44 will be explained.

In this control mode, the power converter unit 30 generates multi-step output voltages with approximately constant step level at its terminals. These output voltages are also referred to as output voltages with "uniform voltage steps".

The number of maximum possible unipolar voltage steps (N) at its output terminals can be distributed as desired between the two voltage systems $u_0$ and $u_1$. The following condition applies here analogously to the equation (3):

$$N_0+N_1=2N_{SM}+2 \quad (4),$$

wherein $N_0$ corresponds to the number of voltage steps between the terminals $A_0$ and $B_0$, and $N_1$ corresponds to the number of voltage steps between the terminals $A_1$ and $B_1$.

In order to control the modules 36 for generating multi-step output voltages in accordance with a first step voltage structure having uniform voltage steps, methods are known from the prior art. Depending on a large number of boundary operating conditions, different control methods for generating the power converter output voltages may be expedient. A simple and robust pulse width modulation method will be proposed below which is referred to below as "standard method" for generating the branch voltages $u_{Zx}$. The pulse width modulation standard method proposed here is extremely robust and can be implemented with little complexity in a power converter controller such as the control unit 44.

The main features of the standard method are as follows:
the branch voltages $u_{Zx}$ are predetermined by the control unit 44 as branch voltage setpoint values $U_{Zset}$ and generated with the aid of a PWM (pulse width modulation) method, with the result that the averaged branch voltage $u_{Zx}$ corresponds to the branch voltage setpoint value $U_{Zset}$ for each PWM period;
there is only one module 36 whose degree of modulation (a) has any desired value between 0 and 1 for each power converter branch 32 and PWM period. All other modules 36 in the branch 32 are either short-circuited (a=0) on the AC-voltage side throughout the PWM period or their energy storage device voltages $U_{SCj}$ are connected with the same polarity as the polarity of the branch setpoint voltage (|a|=1);
the module modulation degree a established by the control unit 44 is compared for each module 36 with a central carrier signal, which is identical for all modules 36 of the power converter unit 30, for example a triangular signal or sawtooth signal, wherein the comparison is based on the generation of the PWM switching commands of each module 36;
all of the module modulation degrees a are calculated corresponding to the flow chart illustrated in FIG. 4. Given this calculation algorithm, all of the storage capacitor voltages $U_{SCj}$ of the power converter unit 30 are determined in each PWM period and transmitted to the control unit 44.

Then, sorting of all modules 36 according to the magnitude of the storage capacitor voltages $U_{SCi}$ takes place per power converter branch 32. Depending on the mode of operation of each branch 32 in the subsequent PWM period, i.e. the branch 32 takes up energy averaged over the period or outputs this energy, as many modules 36 for generating the branch voltage $U_{Zset}$ predetermined by the control unit 44 are used as is necessary at that time. The last selected module 36 in a branch 32 in this case takes on the task of matching the branch voltage $u_{Zx}$ by pulse width modulation in such a way that the setpoint value and the actual value correspond to one another. The remaining modules 36 in the branch 32 stay in a single switching state throughout the PWM period.

FIG. 4 shows a flow chart illustrating the standard method for the calculation of the PWM switching commands of all power converter branches 32.

In accordance with this standard method, the following steps are implemented:

S10: reading all of the storage capacitor voltages $U_{SCj}$ in the period $n_{PWM}$;
S12: sorting all of the storage capacitor voltages $U_{SCj}$ per branch 32 in accordance with the magnitude index k;
S14: calculating the setpoint voltages and currents ($U_{Zset}$, $I_{Zset}$) of all branches 32 by the control unit 44 for the following PWM period $n_{PWM}+1$;
S15: determining the modulation degrees of all modules 36 of a power converter branch 32.

The selection of step S16 or S20 is performed depending on the magnitude $P_{Zset}$ ($n_{PWM}+1$). If the respective power converter branch 32 is intended to output energy during the next modulation period $n_{PWM}+1$, $P_{Zset}$ ($n_{PWM}+1$)<0. When the power converter branch 32 is intended to take up energy or is intended to keep its energy content constant, $P_{Zset}$ ($n_{PWM}+1$)>0 or $P_{Zset}$ ($n_{PWM}+1$)=0.

S16: generating the PWM branch voltage with the highest storage capacitor voltage $U_{SCj}$;
S18: modulation degrees of a branch 32 are determined for the PWM period $n_{PWM}+1$; or
S20: generating the PWM branch voltage with the lowest $U_{SCj}$;
S22: modulation degrees of a branch 32 are determined for the PWM period $n_{PWM}+1$;
S24: transmitting the modulation degrees of each branch to the central control unit 44 for the period $n_{PWM}+1$;
S26: beginning of the PWM period $n_{PWM}+1$ (synchronously for all power converter branches) and the period number $n_{PWM}$ is incremented: $n_{PWM}:=n_{PWM}+1$.

The following index convention is used in FIG. 4:
j: running index for the modules 36 in a branch 32;
k: running index for the modules 36 sorted according to the storage capacitor voltage $U_{SCj}$ (k=0 for the module with the lowest voltage in the branch and $k=N_{SM}$ for the module with the highest voltage in the branch);

j (k): index of the modules 36 in a branch 32 corresponding to the sorting according to the index k;

$n_{PWM}$: index of the presently implemented PWM period $n_{PWM}+1$: index of the following PWM period.

A second control mode of the control unit 44 will now be explained. The second control mode is used for generating a multi-point voltage of each power converter branch 32 with nonuniform step voltages.

The second control mode proposed here is based on the following general considerations.

The number of modules 36 of the modular direct converter with a multi-point voltage comprising uniform step voltages is defined by equation (4). If the number of modules 36 ($N_{SM}$) is extended by $N_{PWM}$ modules 36 of identical design per branch 32 for generating a pulse-width-modulated output voltage with nonuniform step voltages, the effective number of voltage steps of the modular direct converter is increased to the following value:

$$N_0 + N_1 = 2^{N_{PWM}}(2N_{SM}) + 2 \qquad (5)$$

The maximum output voltage of the power converter unit 30 remains constant despite the increase in the total number of modules 36 per branch 32 because the additional $N_{PWM}$ modules which are used for generating the pulse width modulation do not contribute to a rise in this maximum output voltage. The maximum branch voltage can theoretically be generated without the additional $N_{PWM}$ modules. This is achieved by virtue of the fact that the sum of all of the energy storage device voltages of the modules 36 of the first power section 46 is greater than or equal to the maximum branch voltage. This provides a degree of freedom which means that the module output voltages of the additional modules 36 can be regulated by the control unit 44 independently of the branch voltage setpoint value $U_{Zset}$, as explained in more detail below. Owing to this degree of freedom, there is the possibility of optimum regulation of the energy storage device voltages of the additional modules 36 given a limited energy storage device capacitance of the energy storage devices 38.

If equations (4) and (5) are compared, it can be seen that with only one additional module 36 per branch 32, the effective step number of the output voltage is doubled. Correspondingly, the current harmonics in the load are reduced by the same factor.

This method involves pulse width modulation with a nonuniform step voltage with the partial symmetry factor of 2 (multiplication of the step number by $2N_{PWM}$).

At least two variant embodiments are conceivable for the implementation of the second control mode.

In a first variant embodiment, in the case of an existing power converter unit which, such as the power converter unit 30, for example, is intended for generating a multi-point voltage with uniform voltage steps in accordance with a method from the prior art, the number of modules 36 per branch 32 can be extended by $N_{PWM}$ modules, as explained already above.

In a second variant embodiment, in the case of the power converter unit 30 in the existing set 33 of $N_{SM}$ modules 36, a subgroup of $N_{PWM}$ modules can be selected which are assigned to the second control mode described herebelow, while the remaining modules 36 in the set 33 are in principle assigned to a conventional method, in particular the standard method. The control mode described below can accordingly be implemented with the structure already proposed above for the power converter unit 30 as a modular direct converter comprising identical modules 36.

In both embodiments, when implementing the second control mode in each power converter branch 32, a subdivision of the set 33 of modules 36 into two power sections takes place, wherein one power section of $N_{PWM}$ modules is assigned to the implementation of the second control mode (referred to below as "second power section") and one power section is assigned to the remaining modules for in principle implementing the first control mode (for example the standard method) (referred to below as "first power section").

The modules 36 of the second power section 48, which are used for generating nonuniform step voltages by means of pulse width modulation, are also referred to below as "PWM modules". The following numbering convention will be used: the modules 36 of the second power section 48 are denoted by an index "x", wherein $x = 1 \ldots N_{PWM}$. The energy storage device voltages in the second power section 48 are denoted by $U_{SC\_PWM}(x)$.

The description of the proposed second control mode is based on the second variant and is given using the example of the power converter unit 30 already under consideration. FIG. 5 illustrates a power converter branch 32 of the power converter unit 30, wherein the abovementioned distribution of the modules 36 in the first power section 46 and the second power section 48 can be seen.

The second control mode is based on regulation of the energy storage device voltages $U_{SCj}$ and the module output voltages $U_{SMj}$ in the modules 36 of the second power section 48.

In the above-described standard method with pulse width modulation, the setpoint value $U_{SCset}$ of the energy storage device voltage is identical for all of the energy storage devices 38 participating in the standard method. This setpoint value $U_{SCset}$ is an ideal value, wherein the standard method takes into consideration discrepancies between the individual values $U_{SCj}$ and this ideal value (see in particular FIG. 4).

The energy storage device voltage setpoint value of the modules 36.x which are used for generating the PWM with nonuniform step voltages is lower by factors:

$$U_{SCset\_PWM}(x) \geq U_{SCmax}/2^x \qquad (6),$$

wherein $U_{SCmax}$ corresponds to the maximum storage capacitor voltage within the branch 32. In order that the PWM modules 36.x are operated safely within the modulation limits, the above equation should be met.

The regulation of the storage capacitor voltages $U_{SC\_PWM}(x)$ of the PWM modules 36.x will now be explained.

In order to regulate the energy storage device voltages $U_{SC\_PWM}(x)$ corresponding to equation (6), it is possible to establish for each PWM module 36.x, independently of the operating state of all other modules 36, whether the respective energy storage device 38 is intended to be charged by the branch current $I_Z$ or discharged in the following PWM period. This means that, independently of the total voltage of all of the PWM modules 36.x to be realized, the voltage regulation of each PWM module 36.x can freely select the output voltage of said PWM module. This will be explained in more detail below. Thus, despite the relatively low energy content of the energy storage device 38 of the PWM modules 36.x, the voltage value $U_{SC\_PWM}(x)$ of said energy storage device can be regulated in optimum fashion. This is set within the maximum limits of equation (7) below.

If the fact that the maximum energy storage device voltage change within a PWM period (ΔU) fluctuates within the range of from 5 to 10% of the energy storage device rated voltage in the case of a conventional power converter design is taken into consideration, it is possible to see from equation (7) that, with 2 to 3 PWM modules 36.x per branch 32, an operationally expedient limit is reached. A reduction in the distortion factor of the output and branch currents by approximately a factor of $2^{N_{PWM}}$, where $N_{PWM}=1$ to 3, can already represent a significant advantage for specific applications.

$$U_{SCmax}/2^x \le U_{SC\_PWM}(x) \le U_{SCmax}/2^x + 2\Delta U \quad (7),$$

where $\Delta U=(I_{Zmax}/C_{SM})*T_{PWM}$. In this case, $I_{Z\_max}$ corresponds to the maximum branch current, $T_{PWM}$ corresponds to the period duration and $C_{SM}$ corresponds to the capacitance value of the energy storage device 38 in the form of a storage capacitor.

The second control mode in relation to the entire power converter branch 32 will now be explained.

In the standard method, depending on the branch voltage setpoint value $U_{Zset}$ and the individual energy storage device voltages $U_{SCj}$, any desired module 36 in a branch 32 is selected for setting the branch voltage $u_{Zx}$ by pulse width modulation: there is only one module 36 whose modulation degree (a) has any desired value between 0 and 1 per power converter branch 32 and PWM period. All other modules in the branch 32 are either short-circuited (a=0) on the AC-voltage side throughout the PWM period or their storage capacitor voltages $U_{SCj}$ are connected with the same polarity as the polarity of the branch setpoint voltage (|a|=1); see above and the calculation of the modulation degrees a of the modules 36 in FIG. 4.

In the method proposed here for generating a multi-point output voltage with nonuniform step voltages in accordance with the second control mode, of the control unit 44, $N_{PWM}$ modules 36.x are permanently selected per branch 32, which modules generate the difference between the branch voltage setpoint value $U_{Zset}$ and the total voltage of the modules 36 connected throughout the period, namely the modules 36 which are operated with the modulation degree |a|=1, by means of pulse width modulation in each PWM period.

The method proposed here makes it possible to ensure that all of the PWM modules 36.x which are operated for implementing the PWM with nonuniform step voltages at a reduced energy storage device voltage $U_{SC\_PWM}(x)$ can independently of one another freely select the mathematical sign or the polarity of their module output voltage $u_{SMj}$ at each operating point. This is possible without restrictions with respect to the output voltage or the minimum amplitude of the step voltage resulting from this.

The selection of the polarity of the module output voltages $u_{SMj}$ is in addition performed independently of the polarity of the branch voltage setpoint value $U_{Zset}$.

The method for driving the PWM modules 36.x is proposed with reference to the example of pulse width modulation of a branch 32 with three PWM submodules ($N_{PWM}=3$):

1. The control of the modules 36 of the first power section 46 is performed with a small exception corresponding to the standard method. The exception relates to the module 36 last selected in accordance with the standard method, which module is intended to impress the difference with respect to the branch voltage setpoint value $U_{Zset}$ with the aid of the pulse width modulation. This submodule, as a deviation from the standard method, now has the task of impressing, together with the PWM modules 36.x (modules in the second subgroup 48), the difference with respect to the branch voltage setpoint value $U_{Zset}$ (this difference corresponds to the difference between the branch voltage setpoint value $U_{Zset}$ and the total voltage of the contributing modules 36 of the first power section 46, i.e. the modules 36 for which the modulation degree |a|=1 has been established by the standard method). This submodule is provided with the PWM index x=0 for the following considerations.

2. The three PWM modules 36.x are regulated in such a way that their energy storage device voltages $U_{SC\_PWM}(x)$ according to equation (6) are approximately ½ (x=1), ¼ (x=2) and ⅛ (x=3), respectively, of the value of the remaining energy storage device voltages of the first power section (46), in particular of the value of the energy storage device voltage $U_{SC\_PWM}(x=0)$ of the module 36.0. Accordingly, the module 36.0 has an energy storage device voltage amplitude $U_{SC\_PWM}(x=0)$ which is equal to twice the maximum energy storage device voltage amplitude $U_{SC\_PWM}(x=1)$ of the second power section (48). An amplitude $U_{SC\_PWM}(x=0)$ which is less than twice the maximum energy storage device voltage amplitude of the second power section is likewise possible in accordance with equation (6).

The further method features will now be explained with reference to FIG. 6. Said figure illustrates the step voltage structure which can be generated for the branch voltage $U_Z$ by the control unit 44.

The step voltages which can be generated by means of the modules of the first power section 46 are illustrated on the left-hand side along the axis. This corresponds to a first step voltage structure $S_1$ with uniform step voltages. Within the step voltage structure $S_1$, i.e. between adjacent step voltages of the first step voltage structures, a finer step voltage structure $S_2$ can be generated in the second control mode by different settings for the module output voltages of the second power section 48.

3. With the aid of the PWM modules 36.x, voltage steps 50 are generated which are always between adjacent voltage steps 52, 54 of the remaining modules 36 of the first power section 46. It is always possible here for each branch voltage step to be realized in decoupled fashion from the mathematical sign of the module output voltages $u_{PWM}(x)$, for $x \ge 1$. This enables independent regulation of the energy storage device voltages $U_{SC\_PWM}(x)$ of all of the PWM modules 36.x.

On the basis of the branch voltage setpoint value $U_{Zset}$, the voltage steps which come closest to this value are determined. In the example under consideration, an upper voltage step $U_{ZPWM\_o}$ corresponds to the voltage step 54 and the branch voltage setpoint value $U_{Zset}$ can be approximated from below by a lower voltage step $U_{ZPM\_u}$. Around this voltage step in accordance with the second step voltage structure $S_2$, the polarities of the module output voltages of the PWM modules 36.x in the second power section 48 are established as follows: x=1: −; x=2: +; x=3: +. This determination of the polarities is performed independently of the polarity of the branch voltage to be achieved.

4. The branch voltage setpoint value $U_{Zset}$ is generated by averaging of the two voltage steps $U_{ZPWM\_o}$ and $U_{ZPWM\_u}$. In order that the branch setpoint voltage $U_{Zx}$ is generated exclusively by the two adjacent voltage steps $U_{ZPWM\_o}$ and $U_{ZPWM\_u}$ by pulse width modulation, synchronized switchover of all of the modules 36.x contributing to the pulse width modulation, where x≥0, needs to take place for each PWM period. The two voltage steps $U_{ZPWM\_o}$ and $U_{ZPWM\_u}$ adjacent to the branch setpoint voltage $U_{Zset}$ need to be driven in such a way that the equation (8) is met:

$$aU_{ZPWM\_o}(1-a)U_{ZPWM\_u}=U_{Zset} \quad (8),$$

wherein a corresponds to the modulation degree of the upper voltage step $U_{ZPWM\_o}$.

In addition, in order to ensure the synchronized switchover of all of the modules 36 between the two voltage steps $U_{ZPWM\_o}$ and $U_{ZPWM\_u}$, a special PWM method with edge clocking needs to be used:
- the PWM signals for the upper voltage step are generated with a sawtooth voltage with a falling edge;
- the PWM signals for the lower voltage step are generated with a sawtooth voltage with a rising edge;
- the modules which are required for generating both voltage steps remain in one switching state throughout the PWM period.

Figure 6:
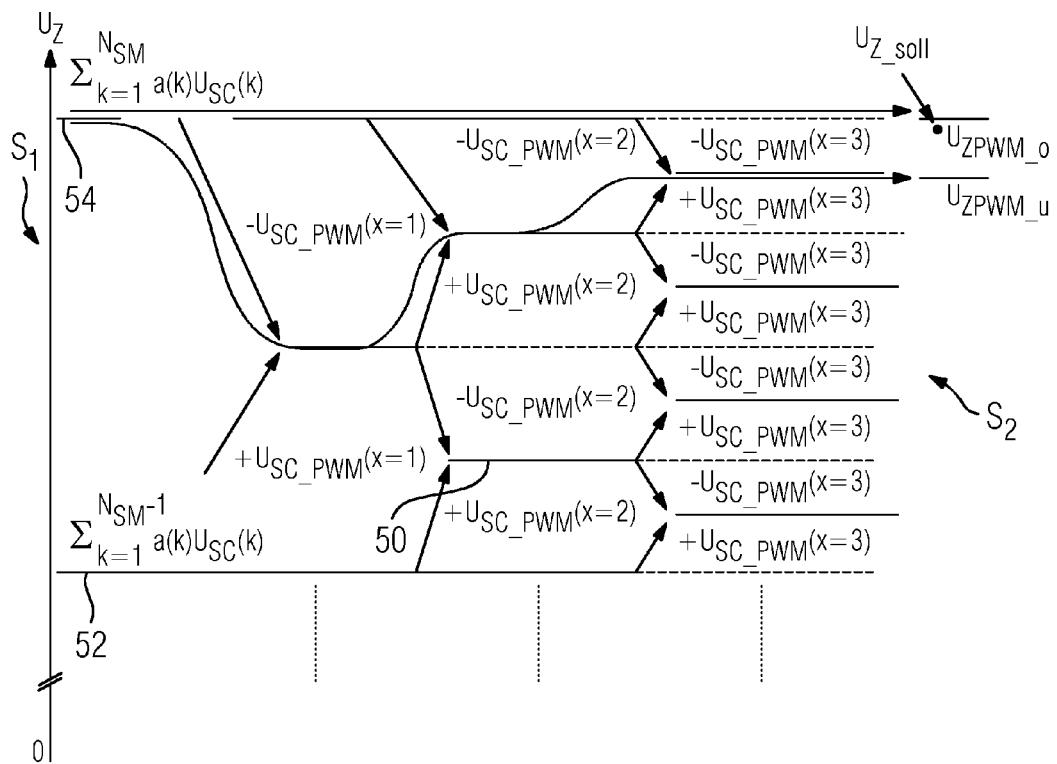
FIG. 6 shows a step voltage structure of the power converter branch shown in FIG. 5.

In the example shown in FIG. 6, according to the above-described method all of the modules 36 of the first power section 46 are connected permanently throughout the PWM period, including the module 36 principally contributing to the PWM with the PWM index x=0 since this module is contributing to the generation of both voltage steps $U_{ZPWM\_o}$ and $U_{ZPWM\_u}$. The modules 36.x of the second power section 48 with the PWM index x=1 to 3 are exclusively contributing to the generation of the lower voltage step $U_{ZPWM\_u}$, with the result that their output voltage is generated by the PWM edge clocking with increasing sawtooth voltage.

The control unit 44 also has the function of establishing the assignment of the modules 36 of the power converter branch 32 to the first or second power section 46, 48. As a result, this assignment can be changed if required by the control unit 44.

The control unit 44 can switch the second control mode on and off. When a second control mode is switched off, the first control mode with the first power section 46 or with the combined first and second power sections 46, 48 is implemented. In this case, the modules 36 in accordance with the standard method are controlled for generating uniform voltage steps 52, 54.

The invention claimed is:

1. A voltage setting device, comprising:
   a multi-step voltage output;
   a power converter unit having a first power section and a second power section, said first and second power sections forming a power converter branch;
   said second power section having a group of modules each including at least one energy storage device, a switch group, and a module output; and
   a control unit configured for controlling said first power section for providing a branch voltage in accordance with a first voltage step structure having voltage steps and, in at least one control mode, for controlling said group of modules for providing the branch voltage in interaction with said first power section in accordance with a second voltage step structure having voltage steps, wherein a step height of the voltage steps of the second voltage step structure is smaller than a step height of the voltage steps of the first voltage step structure.

2. The voltage setting device according to claim 1, wherein the first voltage step structure is defined with uniform voltage steps.

3. The voltage setting device according to claim 1, wherein said first power section comprises a set of modules.

4. The voltage setting device according to claim 3, wherein said first power section and said second power section have mutually identical modules.

5. The voltage setting device according to claim 3, wherein said control unit is configured to selectively assign at least one module of said power converter branch to one of said first power section or said second power section.

6. The voltage setting device according to claim 1, wherein respective modules of at least said second power section are each configured to generate a bipolar module output voltage.

7. The voltage setting device according to claim 1, wherein at least one of said switch groups is a bridge circuit.

8. The voltage setting device according to claim 1, wherein, in the at least one control mode, the branch voltage is generated by a modulation method in accordance with a branch voltage setpoint value to be achieved, wherein, during a modulation period, said first power section contributes to a proportion of the branch voltage setpoint value in accordance with the first step voltage structure, and said modules of said second power section generate a difference of the proportion with respect to the branch voltage setpoint value by modulation.

9. The voltage setting device according to claim 8, wherein said first power section comprises a set of modules, and said control unit is configured to determine which modules of said first power section contribute to the branch voltage during a modulation period depending on the branch voltage setpoint value and in accordance with the first voltage step structure.

10. The voltage setting device according to claim 8, wherein said control unit is configured to establish a combination of the module output voltages of said second power section for the modulation period in accordance with the second voltage step structure, wherein a polarity of the individual module output voltages is independent of the branch voltage setpoint value during a modulation period.

11. The voltage setting device according to claim 8, wherein said energy storage devices of said second power section have different voltages during a modulation period.

12. The voltage setting device according to claim 11, wherein said first power section comprises a set of modules and, during the modulation period, at least one module of said first power section has an energy storage voltage amplitude which is less than or equal to twice a maximum energy storage voltage amplitude of said second power section.

13. The voltage setting device according to claim 8, wherein, in order to generate the branch voltage in accordance with the branch voltage setpoint value, said control unit is configured to determine two voltage steps closest to the voltage setpoint value, and averaging over time of the voltage steps by virtue of PWM edge clocking over the modulation period mapping the branch voltage setpoint value.

14. The voltage setting device according to claim 1, wherein said energy storage devices are storage capacitors.

15. The voltage setting device according to claim 1, wherein the control mode may be switched on and off.

16. A method of providing an electrical voltage, comprising:
   providing a voltage setting device with at least one multi-step voltage output;
   controlling a first power section, which forms at least a section of a power converter branch of the voltage setting device for providing a branch voltage in accordance with a first voltage step structure having voltage steps;
   controlling at least one second power section which, together with the first power section, forms the power converter branch and contains a group of modules each having at least one energy storage device, a switch group, and a module output;

controlling at least the group of modules for providing the branch voltage in interaction with the first power section in accordance with a second voltage step structure having voltage steps, wherein a step height of the voltage steps of the second voltage step structure are smaller than a step height of the voltage steps of the first voltage step structure.

17. A voltage setting device, comprising:
a multi-step voltage output;
a power converter unit having a first power section and a second power section, said first and second power sections forming a power converter branch;
said second power section having a group of modules each including at least one energy storage device, a switch group, and a module output; and
a control unit configured for controlling said first power section for providing a branch voltage in accordance with a first voltage step structure having voltage steps and, in at least one control mode, for controlling said group of modules for providing the branch voltage in interaction with said first power section in accordance with a second voltage step structure having voltage steps;
wherein, in the at least one control mode, the branch voltage is generated by a modulation method in accordance with a branch voltage setpoint value to be achieved, wherein, during a modulation period, said first power section contributes to a proportion of the branch voltage setpoint value in accordance with the first step voltage structure, and said modules of said second power section generate a difference of the proportion with respect to the branch voltage setpoint value by modulation.

18. The voltage setting device according to claim 17, wherein said first power section comprises a set of modules, and said control unit is configured to determine which modules of said first power section contribute to the branch voltage during a modulation period depending on the branch voltage setpoint value and in accordance with the first voltage step structure.

19. The voltage setting device according to claim 17, wherein said control unit is configured to establish a combination of the module output voltages of said second power section for the modulation period in accordance with the second voltage step structure, wherein a polarity of the individual module output voltages is independent of the branch voltage setpoint value during a modulation period.

20. The voltage setting device according to claim 1, wherein said energy storage devices of said second power section have different voltages during a modulation period.

* * * * *